United States Patent [19]
Oshima et al.

[11] Patent Number: 5,043,395
[45] Date of Patent: Aug. 27, 1991

[54] NOVEL OPTICAL MATERIAL

[75] Inventors: Masayoshi Oshima, Niiza; Tadao Natsuume, Yokosuka, both of Japan

[73] Assignee: Nippon Zeon Co., Ltd., Tokyo, Japan

[21] Appl. No.: 439,953

[22] Filed: Nov. 21, 1989

[51] Int. Cl.[5] ..... C08F 8/48
[52] U.S. Cl. ..... 525/332.8; 525/332.9; 525/333.1; 525/333.2; 525/338; 525/339; 525/353; 525/371
[58] Field of Search ..... 525/332.8, 332.9, 333.1, 525/333.2

[56] References Cited

U.S. PATENT DOCUMENTS 4,242,471 12/1980 Lal ..... 525/332.9
4,508,877 4/1985 Todoko et al. ..... 525/333.1
4,678,841 7/1987 Yoshizawa et al. ..... 525/353

FOREIGN PATENT DOCUMENTS 63-43910 2/1988 Japan .

OTHER PUBLICATIONS

J. Macromol. Sci-Chem., A2 (2) pp. 421-446, Mar., 1968.

*Primary Examiner*—Bernard Lipman
*Attorney, Agent, or Firm*—Armstrong, Nikaido, Marmelstein, Kubovcik & Murray

[57] ABSTRACT

There is disclosed an optical material comprising a cyclization product of a conjugated diene polymer having a cyclization ratio of not less than 80% or a hydrogenated product thereof.

9 Claims, No Drawings

NOVEL OPTICAL MATERIAL

BACKGROUND OF THE INVENTION

Industrial Field of the Invention

The present invention relates to an optical material; more specifically it relates to an optical material having excellent properties of optical transmissivity, heat resistance and humidity resistance.

Related Art

Glass or high-molecular-weight substances are generally used as a material for optical recording media in a compact disk, a video disk, a computer disk, etc.; and plastic materials are desirable for a mass-production in view of easiness in a mold processing. In this case, the plastic materials are required to have those properties: (1) optical properties of a good transparency and a high light transmissivity and also of a stable refractive index and a small birefringent index; (2) chemical properties of a good adherence to an optical reflection layer of aluminum, silver or the like, and further of a large protective strength against corrosion; (3) physical properties of strength necessary as a substrate and of resistance enough to a thermal deformation; (4) a good mold-processability, etc.

At present, it is polycarbonate, polymethyl methacrylate, etc., that are used as a plastic material which can comparatively satisfy the above requirements. However, polycarbonate has somewhat high hygroscopicity, is likely to cause birefringence and undergoes hydrolysis due to its molecular structure, although it has good heat resistance since its glass transition point ($T_g$) is high. On the other hand, polymethyl methacrylate causes a corrosion on an optical reflection layer due to its high hygroscopicity and a warpage on a disk surface with a change in dimension and form, in spite of its optical properties of a good transparency and a small refringent index.

The present inventors have made a diligent study to overcome the above defects, and have consequently completed the present invention by finding that a conjugated diene polymer cyclization product having a cyclization ratio of not less than 80% or a hydrogenated product thereof has such properties suitable for an optical material as optical transmissivity, mechanical strength, heat resistance, humidity resistance, etc.

SUMMARY OF THE INVENTION

According to the present invention, there is provided an optical material containing, as a component, a conjugated diene polymer cyclization product having a cyclization ratio of not less than 80% or a hydrogenated product thereof.

The conjugated diene polymer cyclization product of the present invention, usable as an optical material, can be produced by cyclizing a conjugated diene polymer as a material, according to a known method.

DETAILED DESCRIPTION OF THE INVENTION

The above conjugated diene polymer usable as a material is a conjugated diene polymer or copolymer having the following units in the polymer chain.

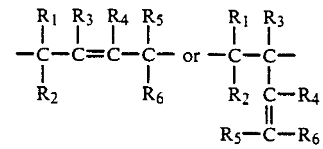

wherein each of $R_1$ to $R_6$ represents a hydrogen atom, alkyl group or aryl group.

As specific examples of the above units, it is possible to cite a 1,4-polybutadiene unit, 1,4-polyisoprene unit, 1,4-polypentadiene unit, 1,2-polybutadiene unit, 1,2-polyisoprene unit, 3,4-polyisoprene unit, 1,4-poly(2-phenylbutadiene) unit, 1,2-polypentadiene unit, etc.

Examples of unsaturated monomers copolymerizable with the above conjugated diene units include vinyl aromatic compounds such as styrene, α-methyl styrene, etc., ethylenically unsaturated nitrile compounds such as acrylonitrile, methacrylonitrile, etc., unsaturated carboxylates such as methyl methacrylate, ethyl acrylate, etc., and others. In the conjugated diene polymer, the ratio of the conjugated diene unit to the above unsaturated monomer unit is 100/0 to 10/90, preferably 100/0 to 40/60.

The conjugated diene polymer usually has a molecular weight of 50,000 to 2,000,000, preferably 100,000 to 1,000,000. When a conjugated diene polymer has a molecular weight smaller than the above lower limit, a cyclization product therefrom has poor physical properties; when a conjugated diene polymer has a molecular weight larger than the above upper limit, the viscosity of the resultant polymer is high when dissolved in a solvent, thus the cyclization reaction thereof is difficult and economically disadvantageous. The above molecular weights represent data (Mw) obtained by a method of high performance liquid chromatography using polystyrene as a standard and tetrahydrofuran as a carrier.

The cyclization product of a conjugated diene polymer of the present invention can be produced by dissolving the conjugated diene polymer in an inert solvent and then bringing the mixture into contact with a cyclizing catalyst, according to a known method.

There is no special limitation to be imposed on the cyclizing catalyst; and examples thereof include sulfonic acids such as p-toluenesulfonic acid, methanesulfonic acid, trifluoromethanesulfonic acid, etc., Friedel-Crafts catalysts such as tin tetrachloride, ferric chloride, boron trifluoride ether complex, etc., and others. The amount of the cyclizing catalyst for use is usually 0.1 to 15 parts based on 100 parts of the conjugated diene polymer.

Concerning the inert solvent, any inert solvent is usable unless it reacts with the cyclizing catalyst and cations formed during a cyclization reaction. Examples thereof include hydrocarbons such as benzene, toluene, xylene, hexane, heptane, etc., halogenated hydrocarbons such as methylene chloride, chlorobenzene, etc., and others.

The concentration of the conjugated diene polymer in a cyclization reaction solution varies depending upon what kind of conjugated diene polymer is used and what cyclization conditions are employed. However, said concentration is usually about 0.5 to 20%.

The pressure and temperature for the cyclization reaction are not specially limited. Usually, the reaction is, however, carried out under atmospheric pressure at a temperature between 0° C. and 120° C.

In the cyclization reaction, after a predetermined cyclization ratio is reached, the reaction is stopped by using water, acid aqueous solution such as hydrochloric acid, sulfuric acid, or the like, alkaline aqueous solution such as sodium carbonate, sodium hydroxide, or the like, or others; and a residual cyclizing catalyst is removed by washing the reaction system with the same to obtain a solution of a cyclization product. Further, this solution may be centrifuged to remove water, etc., which are contained in small amounts in the solution.

Then, the cyclization product is recovered as a solid by a known method, e.g. by pouring the solution into a nonsolvent for the conjugated diene polymer cyclization product.

In addition, in order to prevent gelation of the conjugated diene copolymer cyclization product, a usual aging preventor of a phenol type, sulfide type, phosphite type, amine type, or the like may be incorporated thereto.

In general, the synthesis of the polymer cyclization product of the present invention is carried out in a two-step process as described above. Naturally, however, the polymerization and cyclization may be carried out at the same time in one reaction system. As a process for carrying out the polymerization and cyclization at the same time, it is possible to cite a known process, e.g. a process described in J. Macromol. Sci. Chem., A2 (2), pp. 421~446, March 1968. That is, the polymerization and cyclization can be carried out at a high temperature in a one-step process by using a usual Ziegler catalyst, e.g. an Al-Ti-based catalyst.

In the present invention, the cyclization ratio of the conjugated diene polymer cyclization product is required to be not less than 80%. When the cyclization ratio is less than 80%, the resultant cyclization product has a poor heat resistance and therefore cannot be put to a practical use.

The cyclization ratio above for a polyisoprene-based polymer is measured by using proton NMR spectrum according to a method of R. K. Agnihotori (phonetic), et al., described in Photographic Science and Engineering, Vol. 16, No. 6, pp. 443~448; and that for a polybutadiene-based polymer is done by using proton NMR spectrum according to a method of Tanaka, et al., described in Journal of Polymer Science, Polymer Chemistry Edition, Vol. 17, p. 3027.

The glass transition point ($T_g$) of the conjugated diene polymer cyclization product or its hydrogenated product of the present invention fully meets a requirement level required for optical materials; and it is usually not less than 70° C., preferably not less than 90° C.

Further, the conjugated diene copolymer cyclization product has a molecular weight (Mw), measured by the aforementioned measurement method, of 10,000 to 1,000,000, preferably 50,000 to 800,000.

The hydrogenated product of the conjugated diene polymer cyclization product of the present invention can be obtained by hydrogenating the conjugated diene polymer cyclization product obtained as described above. The hydrogenation ratio may be theoretically in the range of from 0 to 100% if the case that all the double bonds of the conjugated diene polymer cyclization product are hydrogenated into saturation is defined to be 100%. And the hydrogenation ratio can be actually selected at discretion within the above range by changing hydrogen pressure, reaction temperature, reaction time, catalyst concentration, etc. Higher hydrogenation ratios are, however, preferable to improve a heat resistance and a light resistance.

The reaction for the above hydrogenation of the conjugated diene polymer cyclization product can be usually carried out according to a known method. The hydrogenating catalyst may be the one which can be generally used to hydrogenate olefins, although it is not specially limited. Examples thereof are as below. As a heterogeneous catalyst, it is possible to cite nickel, palladium, platinum or solid catalysts in which these metals are held on carbon, silica, diatomaceous earth, alumina, titanium oxide, etc., e.g. nickel/silica, nickel/diatomaceous earth, palladium/carbon, palladium/silica, palladium/diatomaceous earth, palladium/alumina, etc. As a homogeneous catalyst, it is possible to cite catalysts based on metals of group VIII of the periodic table, e.g. those consisting of an Ni or Co compound such as nickel naphthenate/triethyl aluminum, cobalt octenoate/n-butyl lithium, nickel acetylacetonate/triethyl aluminum, or the like and an organometallic compound of a metal of groups I to III of the periodic table, or a catalyst of an Rh compound.

The hydrogenation reaction is carried out under a homogeneous system or a heterogeneous system depending upon a catalyst, under a hydrogen pressure of 1 to 150 atm, at a temperature between 0° C. and 200° C., preferably between 20° C. and 150° C.

In order to further improve the resistance of the hydrogenated product to an oxidative deterioration, it is possible to incorporate stabilizers such as a ultraviolet light absorber, etc., in such an amount that a transparency is not degraded. It is also possible to use other polymers compatible therewith in combination.

The conjugated diene polymer cyclization product or the hydrogenated product thereof of the present invention can be molded into an optical material by usual molding methods such as a casting method, a compression molding method, an injection molding method, a spin coat method, or the like.

Not only molded articles so obtained are usable in a field of optical recording materials such as a compact disk, a video disk, a computer disk, etc., but also, on account of excellent properties of transparency, humidity resistance, heat resistance, etc., they are usable in fields of optical communication materials such as an optical fiber, an optical fiber connector, a prism, a plastic lens, etc., a protective film for a lens or a photoresist, a carrier film, etc.

The present invention will be further described with reference to Examples. In Examples, Comparative Examples and Referential Examples, part and % stand for values based on weight, unless otherwise specified.

REFERENTIAL EXAMPLE 1

A separable flask having a volume of 2 l was charged with 10 g of an isoprene polymer (cis-1,4-structural unit 44.8%, trans-1,4-structural unit 19.6%, 3,4-structural unit 35.6%, Mw=235,000); and a nitrogen substitution was carried out in the flask. Then, 390 g of dehydrated toluene was added under a nitrogen current; and the mixture was stirred to form a homogeneous solution. While the temperature in the reaction system was kept at 20° C., 0.1 g of trifluoromethanesulfonic acid was added; and the mixture was stirred for 60 minutes. Then, 1 l of sodium carbonate 5% aqueous solution was added with stirring to stop the reaction, 0.1 g of BHT (2,6-di-tertbutyl phenol) was added to prevent a gelation of the formed product; and then the formed product was recovered by precipitating it with a large excess of methanol, further washed with methanol and then dried, to give a cyclization product having an Mw of 180,000, a cyclization ratio of 96% and a Tg of 100° C.

REFERENTIAL EXAMPLE 2

A 1-liter autoclave was charged with 400 g of cyclohexane 5% solution of the polymer product obtained in Referential Example 1 together with 2 g of a catalyst in which 5% of palladium was held on carbon. Hydrogen substitution was carried out in the reactor; and the temperature of the reactor was increased to 120° C. with stirring. When the temperature of the reactor became uniform, the hydrogen pressure was elevated to 70 atm. While supplying hydrogen to compensate the deficiency of it caused by the reaction, the reaction was continued for 8 hours. Then, the catalyst in the reaction product was filtered; and the reaction product was precipitated in a large amount of an acetone-isopropyl alcohol (1/1) mixed solvent, then filtered and dried, to give a hydrogenated product having a hydrogenation ratio of 95%.

REFERENTIAL EXAMPLE 3

The procedure of Referential Example 1 was repeated except for using polyisoprene (cis-1,4-structural unit 98%, trans-1,4-structural unit 2%, Mw=700,000), to give a cyclized polyisoprene having a cyclization ratio of 95% and a Mw of 250,000.

procedure of Referential Example 2 to give a polymer having a hydrogenation ratio of 95%.

REFERENTIAL EXAMPLE 5

The procedure of Referential Example 1 was repeated except for using a butadiene polymer (Mw=210,000, 1,2-structural unit 96%, trans-1,4-structural unit 4%) in place of the isoprene polymer, to give a cyclization product having a Mw of 155,000, a cyclization ratio of 97% and a Tg of 98° C.

REFERENTIAL EXAMPLE 6

The procedure of Referential Example 5 was repeated except that the reaction time was changed to 180 minutes, to give a cyclized polyisoprene having a Mw of 165,000 and a cyclization ratio of 72%.

EXAMPLE 1

The polymers obtained in Referential Examples 1 to 6 and polymethyl methacrylate were respectively prepared into 2% toluene solutions; and the 2% toluene solutions were cast on glass sheets to give thin films having a thickness of 10 μm.

The cyclized polyisoprene obtained in Referential Example 2 was press-molded in a mold at 200° C. under a pressure of 100 kg/cm$^2$ to give a molded article having a thickness of 1 mm.

Table 1 shows properties of these thin films and a molded article.

TABLE 1

| | Experiment No. | | | | | | | | Measurement method |
|---|---|---|---|---|---|---|---|---|---|
| | 1 | 2 | 3 | 4 | 5 | 6 | 7* | 8* | |
| King of polymer | Referential Example 1 | Referential Example 2 | Referential Example 3 | Referential Example 4 | Referential Example 5 | Referential Example 2 | Referential Example 6 | — | |
| | Cyclized polyisoprene | → | → | → | Cyclized butadiene | Cyclized polyisoprene | Cyclized polyisoprene | PMMA** | |
| Molecular weight (× 10,000) | 18.0 | 18.0 | 25.0 | 16.0 | 15.5 | 18.0 | 16.5 | — | High-Performance liquid chromatography |
| Cyclization ratio (%) | 96 | 96 | 95 | 85 | 97 | 96 | 72 | — | NMR |
| Hydrogenation ratio (%) | 0 | 95 | 0 | 95 | 0 | 95 | 0 | — | NMR |
| Tg (°C.) | 100 | 102 | 98 | 70 | 98 | 102 | 25 | 95 | DSC |
| Light transmissivity at 830 nm | 90 | 95 | 90 | 92 | 91 | 95 | 83 | 93 | JIS X6717 |
| Water absorption | 0.02 | 0.01 | 0.01 | 0.01 | 0.02 | 0.01 | 0.01 | 0.4 | JIS X6911 |
| Film forming method | Cast | → | → | → | → | Press | Cast | Cast | — |

*Comparative Example
**Polymethyl methacrylate (Acrylite, manufactured by Mitsubishi Rayon Co., Ltd.)

REFERENTIAL EXAMPLE 4

A 2-liter separable flask of glass was charged with 1,000 g of 6% toluene solution of polyisoprene (cis-1,4-structural unit 86%, trans-1,4-structural unit 12%, 3,4-structural unit 2%, and Mw=200,000); and nitrogen substitution was carried out in the system. Then, 2.5 g of p-toluenesulfonic acid was added at 85° C. with stirring. After the stirring was continued for 5 hours, 250 g of water was charged to stop the reaction. After the flask was left to stand, an oily layer was separated; and the remaining polymer was washed with 250 g of water five times. The polymer was recovered by charging it into a large excess of 1% BHT methanol solution, and dried under reduced pressure. This cyclized polyisoprene had a Mw of 160,000 and a cyclization ratio of 85%. This cyclized polymer was subjected to the hydrogenation As discussed above, by using a conjugated diene polymer cyclization product having a cyclization ratio of not less than 80% or a hydrogenated product thereof as a constituent material according to the present invention, it is possible to obtain an optical material having better light transmissivity, heat resistance and humidity resistance than any optical material of prior art.

What is claimed is:

1. An optical material comprising a cyclization product of a conjugated diene polymer or a hydrogenated product of said cyclization product, said cyclization product having a cyclization ratio of not less than 80% and a molecular weight (Mw) of 50,000 to 800,000, said polymer having a molecular weight (Mw) of 100,000 to 1,000,000 before cyclization.

2. An optical material according to claim 1 wherein the conjugated diene polymer cyclization product or the hydrogenated product thereof has a glass transition point of not less than 70° C.

3. An optical material according to claim 1 wherein the conjugated diene polymer cyclization product has a cyclization ratio of not less than 85%.

4. An optical material according to claim 1 wherein the conjugated diene polymer cyclization product or the hydrogenated product thereof is formed of the following component unit:

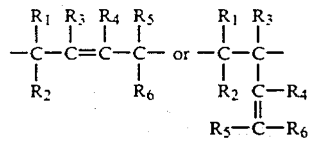

wherein each of $R_1$ to $R_6$ represents a hydrogen atom, alkyl group or aryl group.

5. An optical material according to claim 4 wherein the constituent unit has 4 to 5 carbon atoms.

6. An optical material according to claim 1 wherein the hydrogenated product has a hydrogenation ratio of not less than 90%.

7. An optical material according to claim 1 wherein the conjugated diene polymer is a homopolymer of a conjugated diene.

8. An optical material according to claim 1 wherein the conjugated diene polymer is a copolymer of a conjugated diene with other unsaturated monomer(s).

9. An optical material comprising a hydrogenated cyclization product of a conjugated diene polymer, wherein the cyclization ratio of said cyclization product is not less than 80%, the hydrogenation ratio of said hydrogenated product is not less than 90%, said cyclization product has a molecular weight of 50,000 to 800,000 (Mw), and said polymer has a molecular weight (Mw) of 100,000 to 1,000,000 before cyclization.

* * * * *